US007224548B1

(12) United States Patent
Emo

(10) Patent No.: US 7,224,548 B1
(45) Date of Patent: May 29, 2007

(54) DETERMINING CONTACT WRITE CURRENT IN DISK DRIVE USING POSITION ERROR SIGNAL VARIANCE

(75) Inventor: Bruce Emo, Longmont, CO (US)

(73) Assignee: Maxtor Corporation, Longmont, CO (US)

( * ) Notice: Subject to any disclaimer, the term of this patent is extended or adjusted under 35 U.S.C. 154(b) by 242 days.

(21) Appl. No.: 10/338,046

(22) Filed: Jan. 6, 2003

Related U.S. Application Data

(60) Provisional application No. 60/345,091, filed on Jan. 4, 2002.

(51) Int. Cl.
*G11B 5/596* (2006.01)
(52) U.S. Cl. .................................................. 360/78.04
(58) Field of Classification Search ............. 360/78.04, 360/48, 75, 77.02, 78.14, 31, 60; 702/191
See application file for complete search history.

(56) References Cited

U.S. PATENT DOCUMENTS

| | | | | |
|---|---|---|---|---|
| 5,210,669 A | | 5/1993 | Weispfenning et al. ..... 360/124 |
| 5,303,107 A | | 4/1994 | Miura et al. ................. 360/137 |
| 5,416,652 A | * | 5/1995 | Lewis ......................... 360/48 |
| 5,519,546 A | * | 5/1996 | Lewis ......................... 360/48 |
| 5,541,784 A | * | 7/1996 | Cribbs et al. ................. 360/75 |
| 5,754,355 A | | 5/1998 | Nakamura et al. ........ 360/73.03 |
| 5,760,990 A | * | 6/1998 | Ukani et al. ............... 360/77.04 |
| 5,870,241 A | * | 2/1999 | Ottesen et al. ............ 360/77.02 |
| 5,877,919 A | | 3/1999 | Foisy et al. ................. 360/104 |
| 5,880,899 A | | 3/1999 | Blachek et al. ............... 360/66 |
| 5,909,661 A | * | 6/1999 | Abramovitch et al. ...... 702/191 |
| 5,956,200 A | | 9/1999 | Kohno et al. ............ 360/77.04 |
| 5,959,801 A | | 9/1999 | Gillis et al. ................... 360/75 |
| 5,991,113 A | | 11/1999 | Meyer et al. ................. 360/75 |
| 6,052,804 A | | 4/2000 | Thowe et al. ............... 714/710 |
| 6,195,219 B1 | | 2/2001 | Smith ......................... 360/66 |
| 6,307,719 B1 | | 10/2001 | Mallary .................... 360/294.7 |
| 6,369,974 B1 | * | 4/2002 | Asgari et al. ............. 360/78.14 |
| 6,381,094 B1 | | 4/2002 | Gill ............................ 360/126 |
| 6,597,530 B2 | * | 4/2002 | Asano et al. ............. 360/78.14 |
| 6,452,735 B1 | | 9/2002 | Egan et al. ................... 360/31 |
| 6,614,624 B2 | | 9/2003 | Shiraishi et al. ......... 360/245.9 |
| 6,671,111 B2 | * | 12/2003 | Ottesen et al. ............... 360/31 |
| 6,687,083 B2 | | 2/2004 | Hsiao et al. ................. 360/126 |
| 6,714,371 B1 | * | 3/2004 | Codilian ...................... 360/60 |
| 6,717,763 B2 | * | 4/2004 | Ottesen et al. ................ 360/75 |
| 6,754,050 B2 | | 6/2004 | Kong et al. ................. 360/317 |
| 6,760,174 B2 | | 7/2004 | Forehand ..................... 360/53 |
| 6,760,191 B1 | | 7/2004 | Yan et al. ................... 360/128 |
| 6,980,383 B2 | * | 12/2005 | Brunnett et al. ............. 360/31 |

OTHER PUBLICATIONS

U.S. Appl. No. 10/337,912, filed Jan. 6, 2003, Darragh et al.
U.S. Appl. No. 10/430,366, filed May 5, 2003, Emo et al.

* cited by examiner

*Primary Examiner*—Fred F. Tzeng
(74) *Attorney, Agent, or Firm*—Myers Bigel Sibley & Sajovec, PA

(57) ABSTRACT

In a disk drive, a contact write current that causes head-disk contact due to pole tip protrusion is detected using a variance of a position error signal (PES). A method of determining the contact write current includes generating PES's in response to the head reading servo sectors on the disk, calculating PES variances wherein each PES variance is a statistical measure of a different group of the PES's, calculating a change in the PES variances, and selecting the contact write current in response to the change in the PES variances.

59 Claims, 10 Drawing Sheets

DETERMINING CONTACT WRITE CURRENT IN DISK DRIVE USING POSITION ERROR SIGNAL VARIANCE

CROSS-REFERENCE TO RELATED APPLICATIONS

The present application claims the benefit of U.S. Provisional Application Ser. No. 60/345,091, filed Jan. 4, 2002, which is incorporated herein by reference in its entirety.

TECHNICAL FIELD

The present application relates to detecting head-disk contact in a disk drive, and in particular to detecting the write current at which head-disk contact occurs.

BACKGROUND INFORMATION

Data storage devices include those normally provided in connection with a host computer or other electronic device. In one general category, data is stored on a fixed or rotating (or otherwise movable) storage medium and a read/write head is positioned adjacent to desired locations of the storage medium for writing data thereto or reading data therefrom. A data storage device of this type is a disk drive.

Disk drives store information on magnetic disks. Typically, the information is stored in concentric tracks on the disk and the tracks are divided into servo sectors that store servo information and data sectors that store user data. A head (or transducer) reads from and writes to the disk. The head is mounted on an actuator arm that moves the head radially over the disk. Accordingly, the actuator arm allows the head to access different tracks on the disk. The disk is rotated by a spindle motor at high speed, allowing the head to access different data sectors on the disk. The head may include separate or integrated read and write elements.

FIG. 1 illustrates a disk drive 10 that includes a disk 12 that is rotated by a spin motor 14. The spin motor 14 is mounted on a base plate 16. The disk drive 10 also includes an actuator arm assembly 18 having a head 20 mounted on a flexure arm 22, which is attached to an actuator arm 24 that rotates about a bearing assembly 26 that is attached to the base plate 16. The actuator arm 24 cooperates with a voice coil motor 28 to move the head 20 relative to the disk 12. The spin motor 14, the head 20 and the voice coil motor 28 are coupled to electronic circuits 30 mounted on a printed circuit board 32. The electronic circuits 30 include a read channel, a microprocessor-based controller and a random access memory (RAM). The disk drive 10 may include multiple disks 12 and therefore multiple actuator arm assemblies 18.

FIG. 5 is a top view of a disk 512 having a disk surface 542 which has embedded servo information. The disk surface 542 includes concentric tracks 544a–544h. Each track 544 is divided into data sectors 546 and servo sectors 548. The servo sectors 548 in each track 544 are radially aligned with the servo sectors 548 in the other tracks 544, thereby forming servo wedges 550 which extend radially across the disk surface 542 from the disk's inner diameter 552 to its outer diameter 554. Although a relatively small number of tracks 544 are shown for ease of illustration, it should be appreciated that typically tens of thousands of tracks 544 are included on the disk surface 542.

During a seek operation, the head 20 is moved from a present track to a target track so that a data transfer can be performed with the target track. In addition, a current is delivered to the voice coil motor 28 which causes the actuator arm 24 to rotate, thereby moving the head 20 radially relative to the disk 12.

During a track following operation, the head 20 is maintained over the target track using a position error signal (PES) based on servo information that the head 20 reads from the servo sectors in the target track.

FIG. 2 is a sectional view of the disk 12 and the head 20. The head 20 (which includes a slider) is located above a disk surface 42 by a flying height 100. The flying height 100 is created by the interaction between air currents above the disk surface 42 (also known as an air-bearing) caused by rotation of the disk 12 and the aerodynamics of the slider of the head 20.

It is important to maintain the flying height 100. For example, if the head 20 flies too low, it is more likely to contact the disk 12, which could cause stored data to be lost. As another example, if the head 20 flies too low, a particle resting on the disk surface 42 may attach to the head 20 and change the aerodynamics of the head 20.

FIG. 3 is an air-bearing surface view of the head 20 which illustrates a write portion 110 of the head 20 and a read portion 120 of the head 20. For clarity, the slider of the head 20 is not shown. The write portion 110 includes a write pole 130 and a return 135. The read portion 120 includes a magneto-resistive (MR) read element 140 along with first and second shields 142, 144. The direction of disk rotation is shown by arrow 150 such that the write pole 130 follows the read element 140.

FIG. 4 is a cross-sectional, side view of the head 20 that illustrates a write coil 155, a write gap 160 and a read gap 165. The write portion 110 writes perpendicular magnetic polarity transitions onto the disk surface 42. Perpendicular recording is well-known in the art and requires a disk that is capable of having perpendicular magnetic polarity transitions recorded thereon, for example, by including a soft magnetic underlayer.

During a write operation, a variable write current is supplied to the write coil 155 to induce magnetic flux across the write gap 160. The direction of the write current defines the direction in which the magnetic flux is oriented across the write gap 160. In simple recording systems, magnetic flux polarized in one direction across the write gap 160 records a binary one while magnetic flux polarized in the opposite direction records a binary zero. In most recording systems, a change in the direction that the magnetic flux travels across the write gap 160 records a binary one while the lack of such change records a binary zero. As the disk 12 travels under the write portion 110, a series of ones and zeros are written to the disk surface 42.

During a read operation, the first and second shields 142, 144 define the read gap 165 which focuses the magnetic flux for a particular magnetic polarity transition onto the read element 140 by shielding the read element 140 from other sources of magnetic flux. In other words, extraneous magnetic flux is filtered away from the read element 140 by the shields 142, 144. The read element 140 generates a read signal in response to the changing magnetic flux which corresponds to previously recorded data as the magnetic polarity transitions in the disk 12 pass underneath it.

The write portion 110 and the read portion 120 are located near the trailing edge of the head 20. Furthermore, the head 20 is pitched relative to the disk surface 42 such that the trailing edge is closest to the disk surface 42 (see FIG. 2). Since the write portion 110 trails the read portion 120, the write portion 110 (specifically the write pole 130) is closest to the disk surface 42. In addition, the write pole 130, the return 135, the read element 140, the first shield 142 and the second shield 144 share a common plane 175 at an air-bearing surface which faces the disk surface 42.

Disk drives usually store information on disks using longitudinal recording as opposed to perpendicular recording. However, the heads associated with longitudinal recording may be very similar to the head 20 in that the write pole, return, read element, first shield and second shield share a common plane.

Although the manufacture, distribution and use of disk drives follow a number of models, tests are usually performed following assembly of a disk drive before it is delivered to a user. The tests include performance, reliability and environmental tests. Environmental tests measure how the disk drive reacts to temperature, pressure or other environmental factors. For example, environmental tests may store information to control the magnitude of the write current as a function of ambient temperature since a high write current may be needed before the disk drive warms up.

Likewise, servo information is usually provided in the servo sectors before the disk drive is delivered to a user. Servo information includes sector markers or identifiers and track markers or identifiers and is typically used for generating the PES to position the head relative to the disk during read and write operations in which user data is received from or sent to a host computer.

The general trend in data storage devices including disk drives is higher data density on the storage medium. Higher data density permits a physically smaller data storage device for a given storage capacity and can also enhance performance (such as reducing seek times). Higher data density often requires a reduction in flying height. However, pole tip protrusion causes difficulties at reduced flying height. Pole tip protrusion refers to thermal expansion of the tip of the write pole 130 towards the disk 12 in response to the write current. At moderately high write currents during prolonged write operations, the write pole 130 may protrude sufficiently to contact the disk 12, especially if the flying height is small. Pole tip protrusion can result in data loss where the write pole 130 contacts the disk 12.

A previous approach to detecting head-disk contact involves detecting write faults caused by the PES going outside a write inhibit window. However, this approach is less sensitive than desired since head-disk contact is not always detected.

Another previous approach to detecting head-disk contact involves detecting thermal asperities, as described in U.S. Pat. No. 6,195,219. While the thermal asperity approach provides acceptable results for contact recording, there is substantial room for improvement for non-contact recording (in which the head flies over the disk).

Accordingly, it would be useful to provide an improved approach for detecting head-disk contact as well as determining the contact write current at which head-disk contact occurs or is likely to occur.

SUMMARY

The present invention detects head-disk contact and determines a contact write current based on a variance of the position error signal (PES).

A method of determining the contact write current includes generating PES's in response to the head reading servo sectors on the disk, calculating PES variances wherein each PES variance is a statistical measure of a different group of the PES's, calculating a change in the PES variances, and selecting the contact write current in response to the change in the PES variances.

The method can include calculating a first group of the PES variances based on a first group of the servo sectors that are consecutive servo sectors in a track, and calculating a second group of the PES variances based on a second group of the servo sectors that are consecutive servo sectors in the track. The first and second groups of the servo sectors can contain the same number of servo sectors, can overlap and can be offset by a single servo sector.

The method can include calculating first PES variances in the first and second groups of the PES variances based on PES's generated while the head has a first temperature, and calculating second PES variances in the first and second groups of the PES variances based on PES's generated while the head has a second temperature that is greater than the first temperature. For instance, the first PES variances can calculated based on PES's generated during an operation of the head in which no write current is applied to the head, and the second PES variances can calculated based on PES's generated during a write operation of the head in which write current is applied to the head.

The method can include calculating each PES variance using a standard deviation of the corresponding PES's.

The method can include increasing the write current applied to the head during write operations in which the PES's are generated, and selecting the contact write current as the write current applied to the head for a PES variance that exceeds a baseline PES variance by a threshold.

Advantageously, the present invention has high sensitivity to head-disk contact for flying heads. In addition, the present invention can be performed by a disk drive using a commonly available PES without external equipment. Furthermore, the present invention can be implemented in a disk drive by making software or firmware changes without additional hardware.

DETAILED DESCRIPTION OF THE PREFERRED EMBODIMENT

The present invention recognizes that variance (a statistical measure) of the PES relates to head-disk contact. This may be due to head vibration, drag and the resultant skew that follow head-disk contact.

In general, variance is defined as:

$$\sigma^2 = \frac{1}{n} \sum_{i=1}^{n} (x_i - \bar{x})^2 \qquad (1)$$

where n is the number of samples, $x_i$ is the PES of the $i^{th}$ sample, $\bar{x}$ is the mean of the sample, and $\sigma^2$ is the variance. The standard deviation (often designated $\sigma$) is the square root of variance.

The present invention also recognizes that changes in PES variance, such as sustained or averaged increases in PES variance, and/or changes in the slope of the relationship between PES variance and write current, as the write current exceeds the contact write current, indicate head-disk contact.

Figure 1:
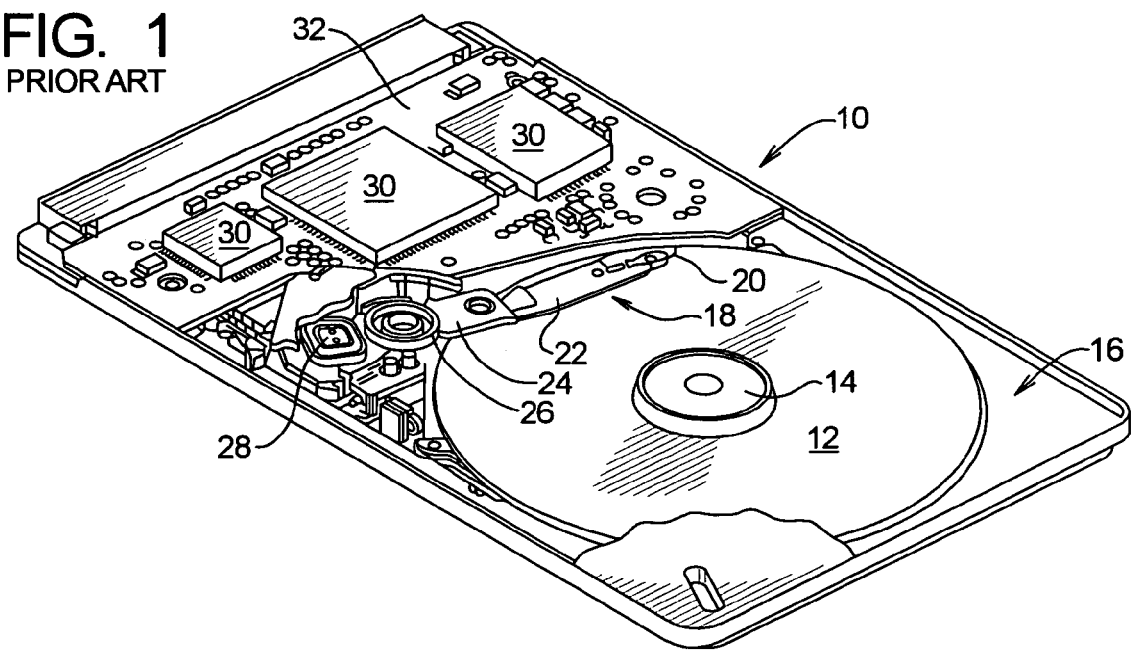
FIG. 1 is a diagrammatic representation of a conventional disk drive.
Figure 2:
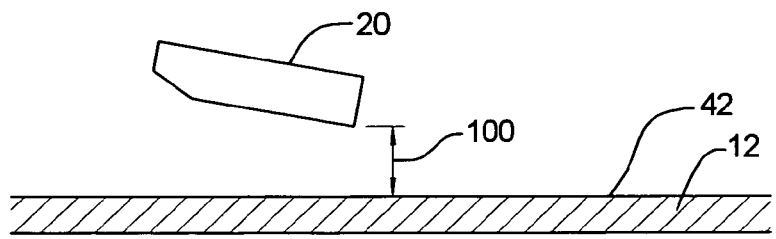
FIG. 2 is a sectional view of a head flying above a disk, as is conventional.
Figure 3:
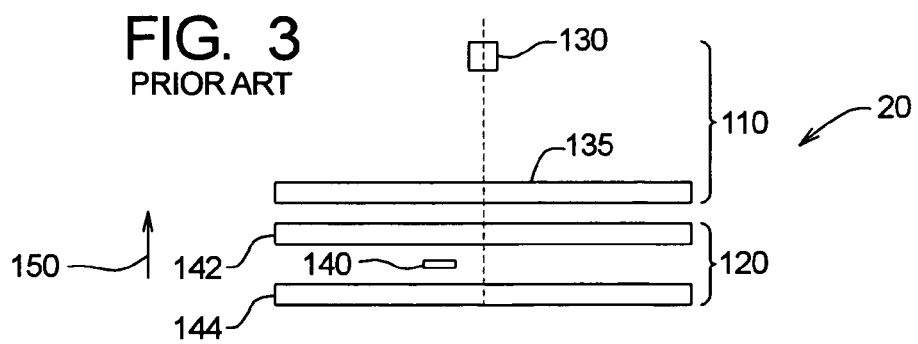
FIG. 3 is an air-bearing surface view of a conventional head, which illustrates a write portion of the head and a read portion of the head.
Figure 4:
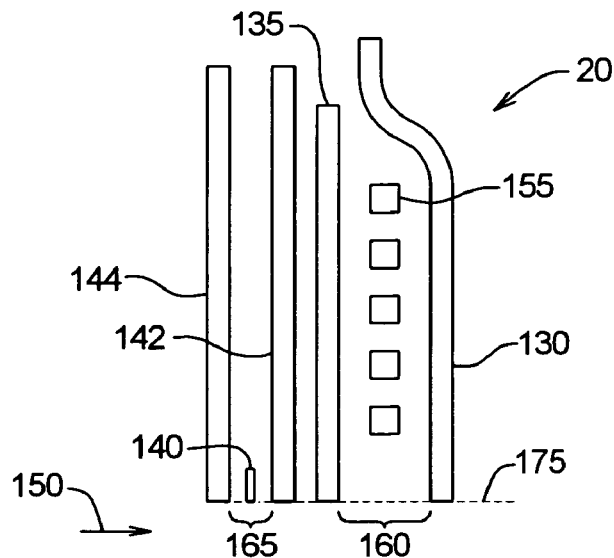
FIG. 4 is a cross-sectional, side view of a conventional head.
Figure 5:
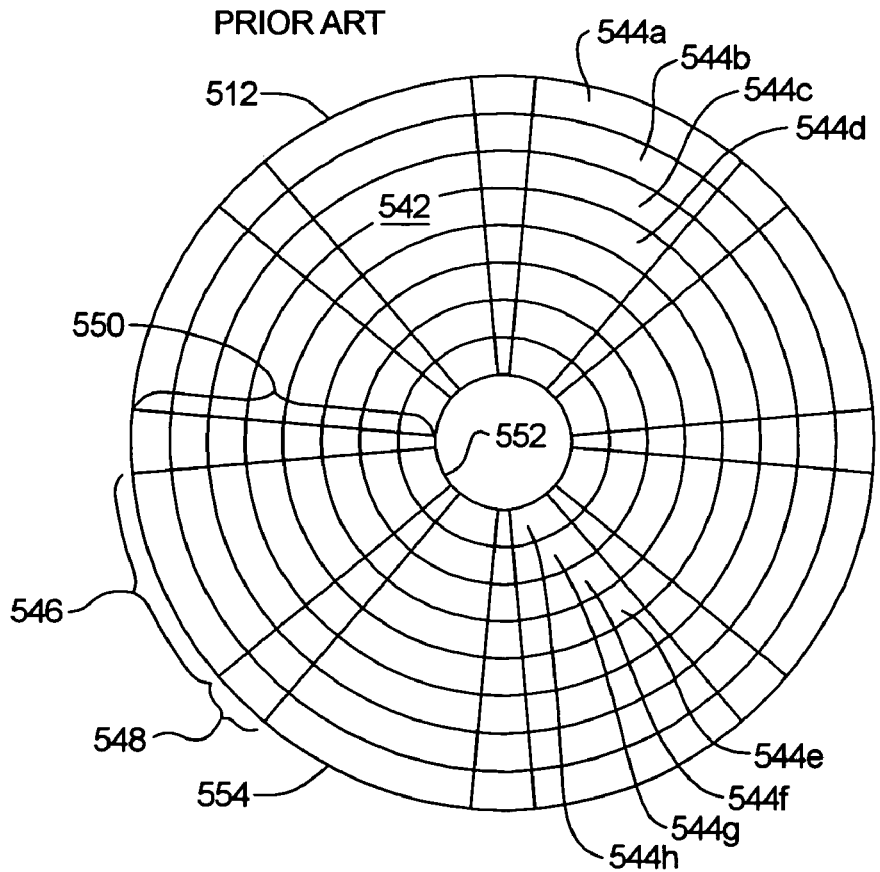
FIG. 5 is a top view of a conventional disk surface that includes embedded servo information.
Figure 6:
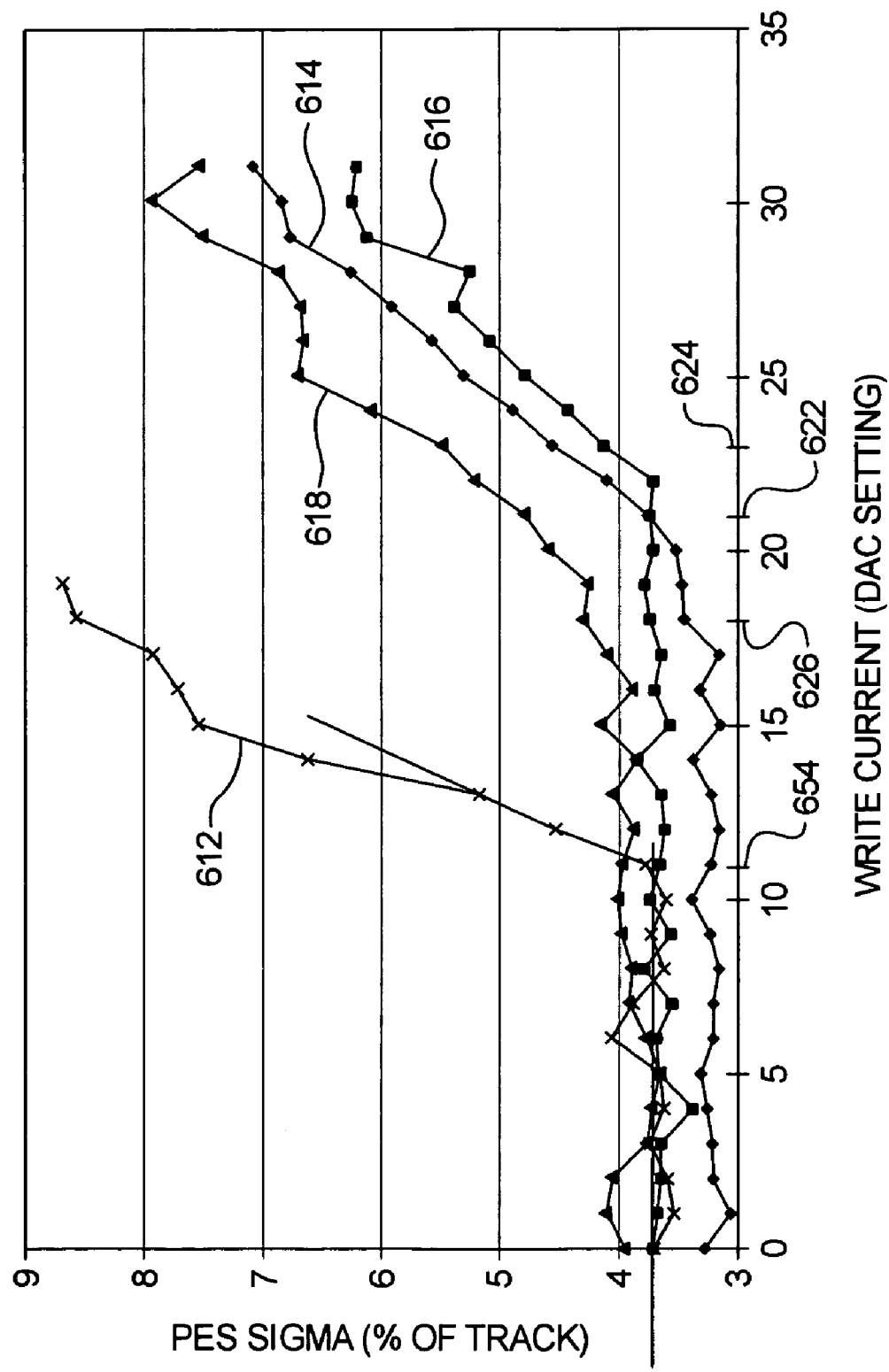
FIG. 6 is a graph showing PES variance as a function of write current for four heads of a disk drive.

FIG. 6 is a graph showing PES variance as a function of write current. Graph 612 for head one shows minimum and relatively random variation when the write current is below the contact write current 654. However, once the write current exceeds the contact write current 654, the PES variance begins to increase. Accordingly, by identifying the write current at which the PES variance begins to significantly increase (compared to a baseline or read PES variance) and/or the point at which the slope of the (best fit) PES variance changes significantly, compared to the typically flat or horizontal slope of the pre-contact write current, PES data and/or the read PES variance, the contact write current can be identified from the PES variance data.

Graphs 614, 616 and 618 show similar phenomena for heads two, three and four, respectively, although each head has a different contact write current 622, 624, 626, respectively, and the magnitude of the increase and/or the slope of the best fit line defined by the PES variance as a function of write current, after the contact write current is used, is different for each head. Accordingly, the contact write current is identified separately for each head.

Furthermore, the magnitude (or slope of best fit line) increases in PES variance is believed to be different for different portions of a disk surface such as different tracks or groups of tracks and/or different servo sectors or groups of servo sectors. Accordingly, the PES variances and the contact write current can be separately measured and calculated for groups of tracks, for each track, for groups of servo sectors along a track and for each servo sector in a track. Preferably, the lowest contact write current for the worst group of servo sectors in the track is used for the entire track rather than separately storing the contact write current for each servo sector in the track.

For example, each group of servo sectors along a track has a predetermined length such as ⅛ or 1/16 revolution of the disk. In addition, each group of servo sectors begins at a different servo sector. For instance, if a track has 256 servo sectors, the first group of servo sectors begins with servo sector 1 and extends ⅛ revolution of the disk to end at servo sector 32. The second group of servo sectors is servo sectors 2 through 33, the third group of servo sectors is servo sectors 3 through 34, and so forth. Thus, the groups of servo sectors are overlapping sets of consecutive servo sectors offset by a single servo sector and include all servo sectors in the track. Likewise, multiple servo sectors in the track are each the beginning servo sector for one of the groups of servo sectors and contained in multiple groups of the servo sectors.

The contact write current (preferably for each track of each disk surface) is determined by and stored in the disk drive during manufacture before the disk drive is delivered to a user. Furthermore, the disk drive prevents the write current from exceeding the contact write current during normal operation by the user, thereby avoiding head-disk contact due to pole tip protrusion.

Figure 7:
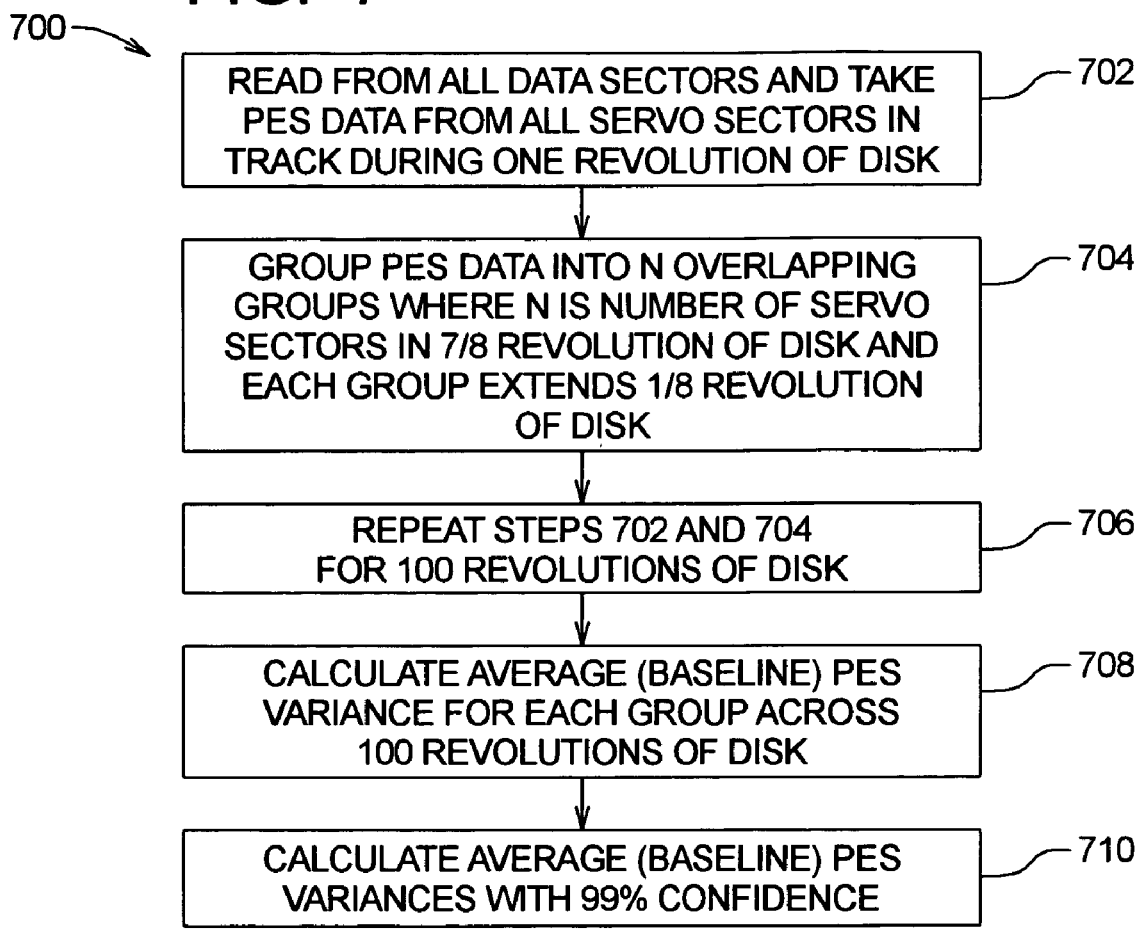
FIG. 7 is a flowchart illustrating a method for determining a baseline PES variance according to an embodiment of the present invention.

FIG. 7 is a flowchart 700 illustrating a method for determining a baseline PES variance. The disk drive reads from (or writes to with zero write current) all data sectors in a track during one revolution of the disk, and records the PES data from all servo sectors in the track during the revolution of the disk into a buffer or processor memory (step 702). The PES data is grouped into N overlapping groups where N is the number of servo sectors in ⅞ revolution of the disk and each group starts at one of the servo sectors in the first ⅞ revolution of the disk and extends for ⅛ revolution of the disk (step 704). The read operation in step 702 and the PES data grouping in step 704 are repeated for a predetermined number of revolutions (such as 100 revolutions) of the disk (step 706). The average of the PES variance for each group across the 100 revolutions of the disk is then calculated and stored to provide a baseline PES variance for each group (step 708). Optionally, sufficient PES data is obtained to calculate the averages with a predetermined statistical confidence level such as 99% confidence (step 710).

Figure 8:
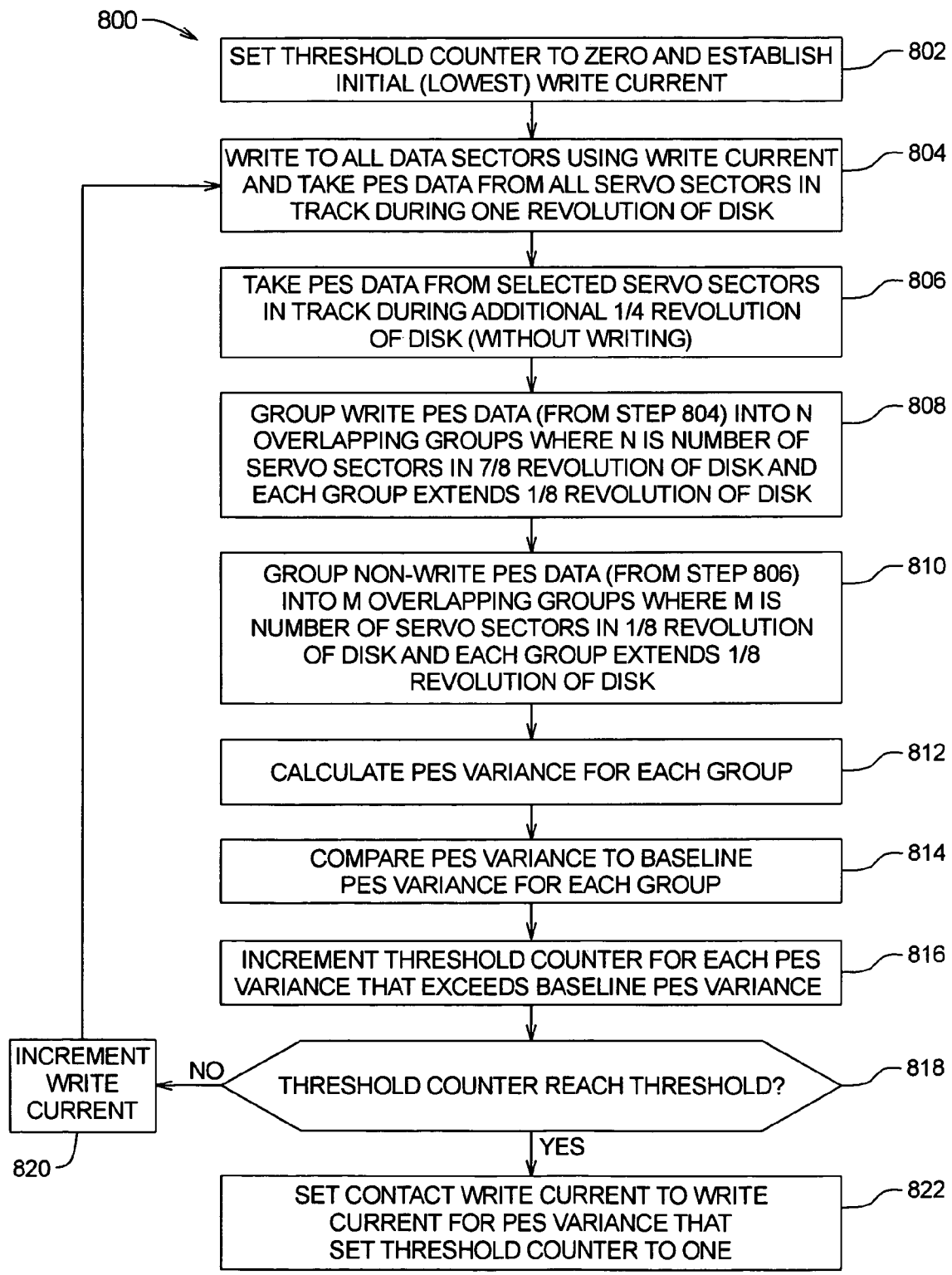
FIG. 8 is a flowchart of a method for determining a contact write current according to an embodiment of the present invention.

FIG. 8 is a flowchart 800 of a method for determining the contact write current. A threshold counter (or similar software counter) is set to zero, and an initial (typically lowest) write current is established (step 802). The disk drive writes to all data sectors in the track during one revolution of the disk using the write current, and records the PES data from all servo sectors in the track during the revolution of the disk (step 804). Optionally, the disk drive records more PES data from selected servo sectors in the track during an additional ¼ revolution of the disk, after the write operation has terminated and no write current is applied to the head, to obtain PES data while the head cools down (step 806). The PES data obtained while the head cools down may be even more sensitive to head-disk contact since terminating the write operation also terminates the track following operation, thereby reducing the PES.

The write PES data is grouped into N overlapping groups where N is the number of servo sectors in ⅞ revolution of the disk and each of the groups starts at one of the servo sectors in the first ⅞ revolution of the disk and extends for ⅛ revolution of the disk (step 808). If cool-down (or non-write) PES data is also obtained in step 806, the cool-down PES data is grouped into M overlapping groups where M is the number of servo sectors in ⅛ revolution of the disk and each of the groups starts at one of the servo sectors in the first ⅛ revolution of the disk and extends for ⅛ revolution of the disk (step 810).

A PES variance is calculated for each of the groups using equation (1) or a substantially equivalent relationship (step 812). The PES variance is calculated assuming a global mean PES is zero to simplify the calculation. Furthermore, the assumption may provide greater sensitivity since the PES data is compared to an ideal or desired position error (namely zero) rather than an actual average position error.

The PES variances are each compared to the corresponding baseline PES variance for the same group (step 814). For instance, the PES variance and the baseline PES variance are compared for the first group of servo sectors in servo sectors 1 through 32, the PES variance and the baseline PES variance are compared for the second group of servo sectors in servo sectors 2 through 33, the PES variance and the baseline PES variance are compared for the third group of servo sectors in servo sectors 3 through 34, and so forth.

The threshold counter is incremented based on the comparisons between the PES variances and the baseline PES variances (step 816). The threshold counter can be incremented for each PES variance that exceeds the baseline PES variance, or alternatively, for each PES variance in a sequence of PES variances that exceeds the baseline PES variance. Likewise, the threshold counter can be incremented if the PES variance exceeds the baseline PES variance, or alternatively, if the PES variance exceeds the baseline PES variance by a threshold such as a fixed amount or a percentage of the baseline PES variance.

The disk drive determines whether the threshold counter reaches a predetermined threshold (such as 3) (step 818). If not, head-disk contact is not detected and the write current is incremented (step 820) and steps 804 to 818 are repeated. Otherwise, head-disk contact is detected and the contact write current is set to the write current used for the PES variance that set the threshold counter to one (step 822).

Figure 9:
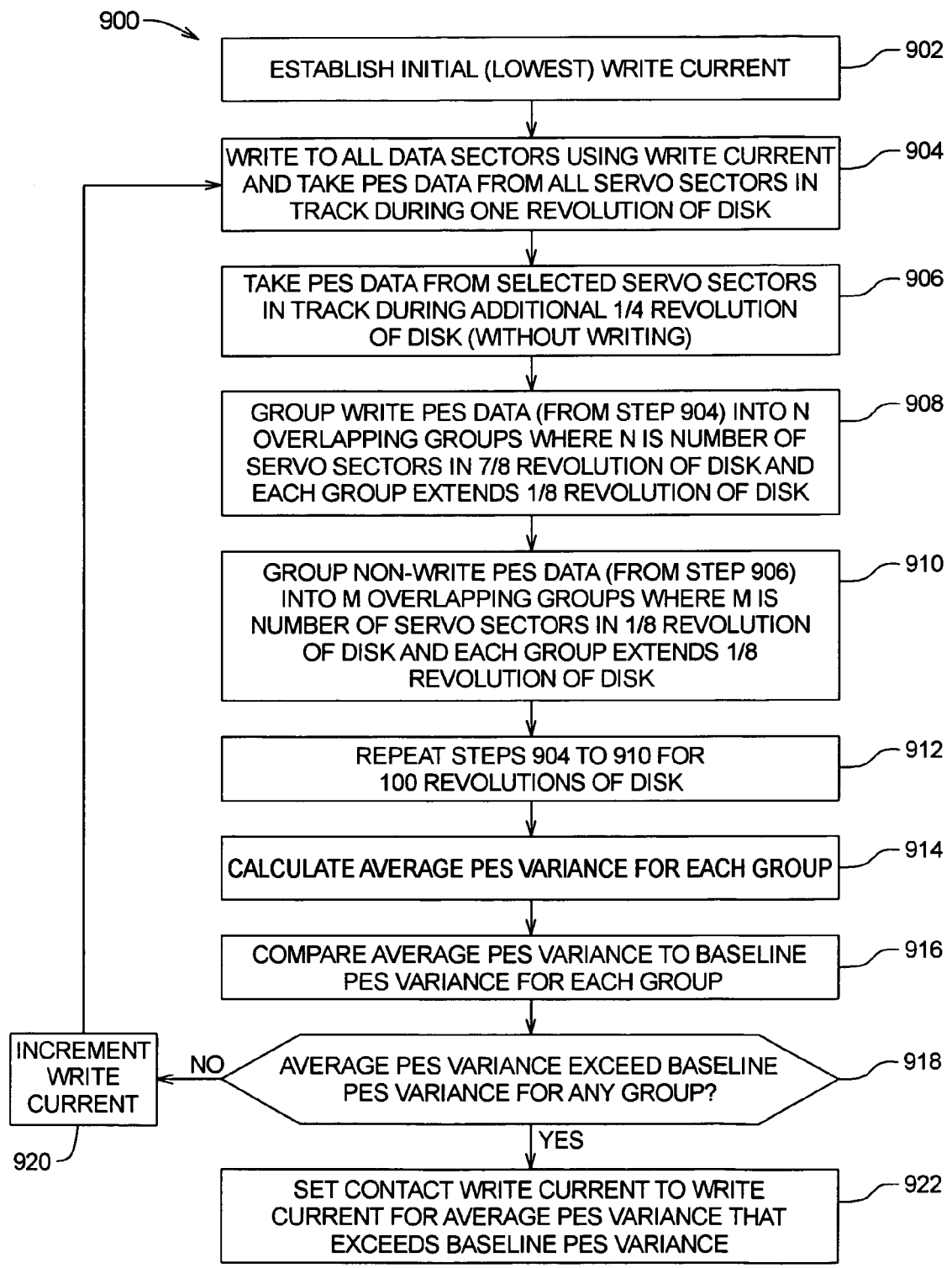
FIG. 9 is a flowchart illustrating a method for determining a contact write current according to an embodiment of the present invention.

FIG. 9 is a flowchart 900 of another method for determining the contact write current. In flowchart 900, average PES variances are compared with the baseline PES variances and the threshold counter is omitted. An initial write current is established (step 902). Steps 904, 906, 908 and 910 are similar to steps 804, 806, 808 and 810, respectively. The write operation in step 904, the cool-down operation in step 906 and the PES data grouping in steps 908 and 910 are repeated for a predetermined number of revolutions (such as 100 revolutions) of the disk (step 912). The average of the PES variance for each group across the 100 revolutions of the disk is then calculated to provide an average PES variance for each group (step 914). The averaging uses a 10% trimmed mean to eliminate outliers in the PES data.

The average PES variances are each compared to the corresponding baseline PES variance for the same group (step 916), and the disk drive determines whether any of the average PES variances exceed the corresponding baseline PES variance, or alternatively, whether any of the average PES variances exceed the corresponding baseline PES variance by a threshold such as a fixed amount or a percentage of the baseline PES variance (step 918). If not, head-disk contact is not detected and the write current is incremented (step 920) and steps 904 to 918 are repeated. Otherwise, head-disk contact is detected and the contact write current is set to the most recently used write current for the average PES variance that exceeds the baseline PES variance (step 922).

Figure 10:
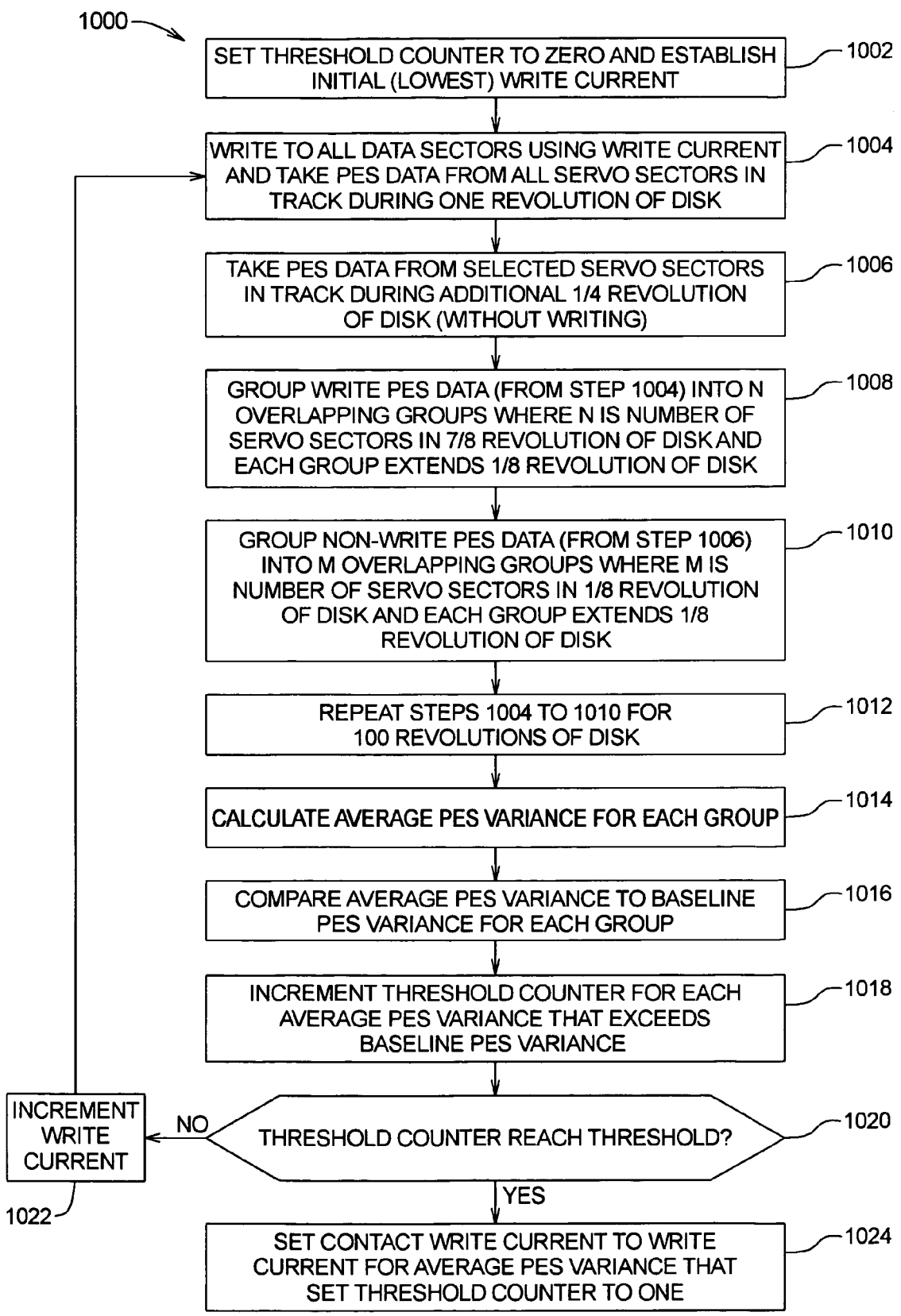
FIG. 10 is a flowchart illustrating a method for determining a contact write current according to an embodiment of the present invention.

FIG. 10 is a flowchart 1000 of another method for determining the contact write current. In flowchart 1000, average PES variances are compared with the baseline PES variances and the threshold counter is used. Steps 1002, 1004, 1006, 1008, 1010 and 1012 are similar to steps 802, 804, 806, 808, 810 and 912, respectively. The average of the PES variance for each group across the 100 revolutions of the disk is then calculated to provide an average PES variance for each group (step 1014). The averaging uses sufficient PES data to achieve 5% confidence in the average PES variance. Steps 1016, 1018, 1020, 1022 and 1024 are similar to steps 814, 816, 818, 820 and 822, respectively, except that the average PES variance rather than the PES variance is compared to the baseline PES variance.

Figure 11:
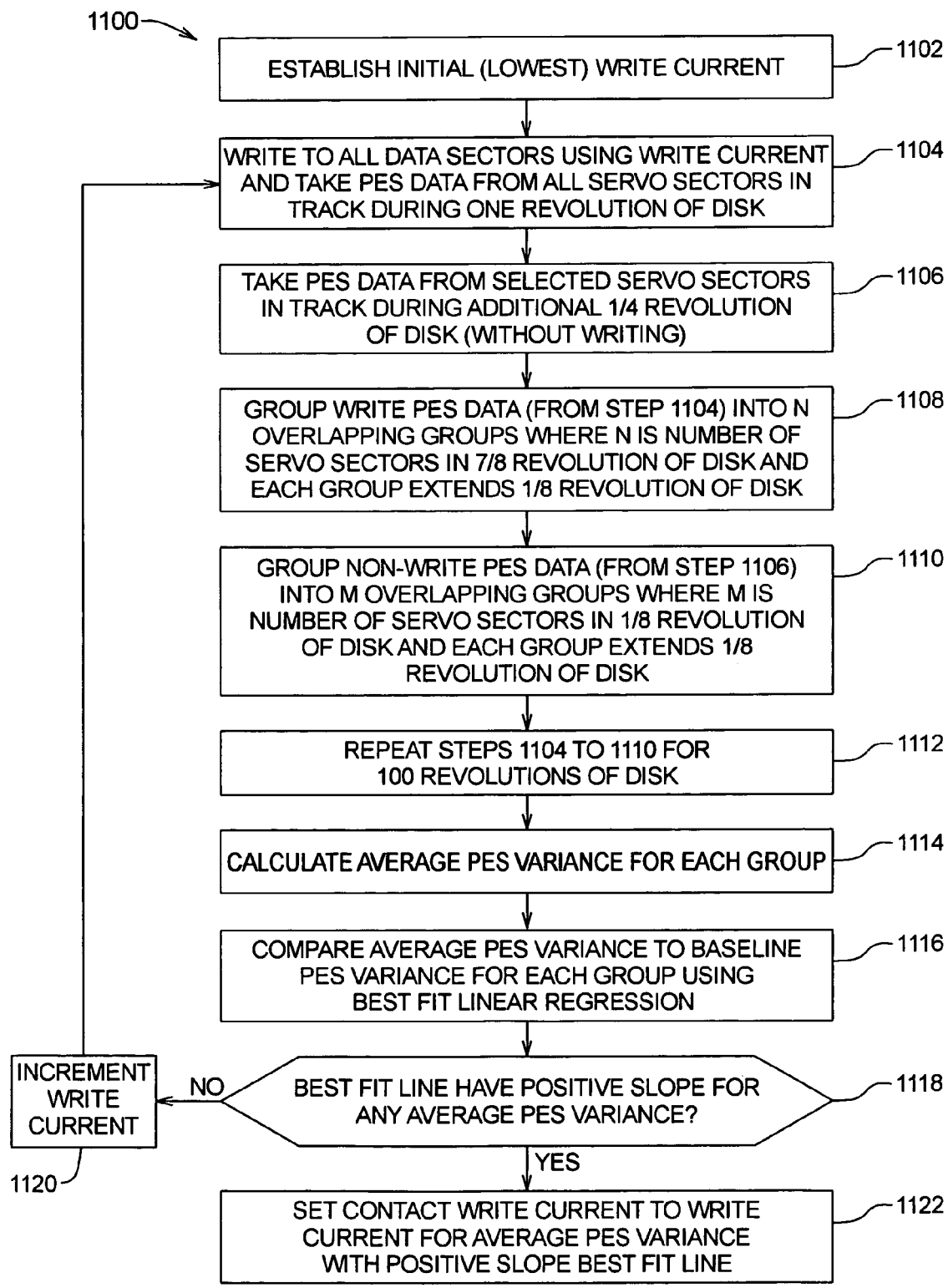
FIG. 11 is a flowchart illustrating a method for determining a contact write current according to an embodiment of the present invention.

FIG. 11 is a flowchart 1100 of another method for determining the contact write current. In flowchart 1100, the PES variances are compared with the baseline PES variances using best fit linear regression and the threshold counter is omitted. Steps 1102, 1104, 1106, 1108, 1110, 1112 and 1114 are similar to steps 902, 904, 906, 908, 910, 912 and 914, respectively. The PES variances are compared with the baseline PES variances using best fit linear regression by determining the slope of a best fit line using a minimum number of write currents (such as 3) for the most recently calculated average PES variances (step 1116).

The disk drive determines whether the slope of the best fit line is positive (assuming the slope of the baseline PES variance is zero), or alternatively exceeds the slope of the baseline PES variance, or alternatively exceeds the slope of the baseline PES variance by a threshold, and optionally whether the best fit line has a minimum goodness-of-fit (step 1118). If not, head-disk contact is not detected and the write current is incremented (step 1120) and steps 1104 to 1118 are repeated. Otherwise, head-disk contact is detected and the contact write current is set to the write current for the average PES variance with a best fit line with positive slope, as indicated by the intersection of the best fit line with the baseline PES variance (step 1122).

Figure 12:
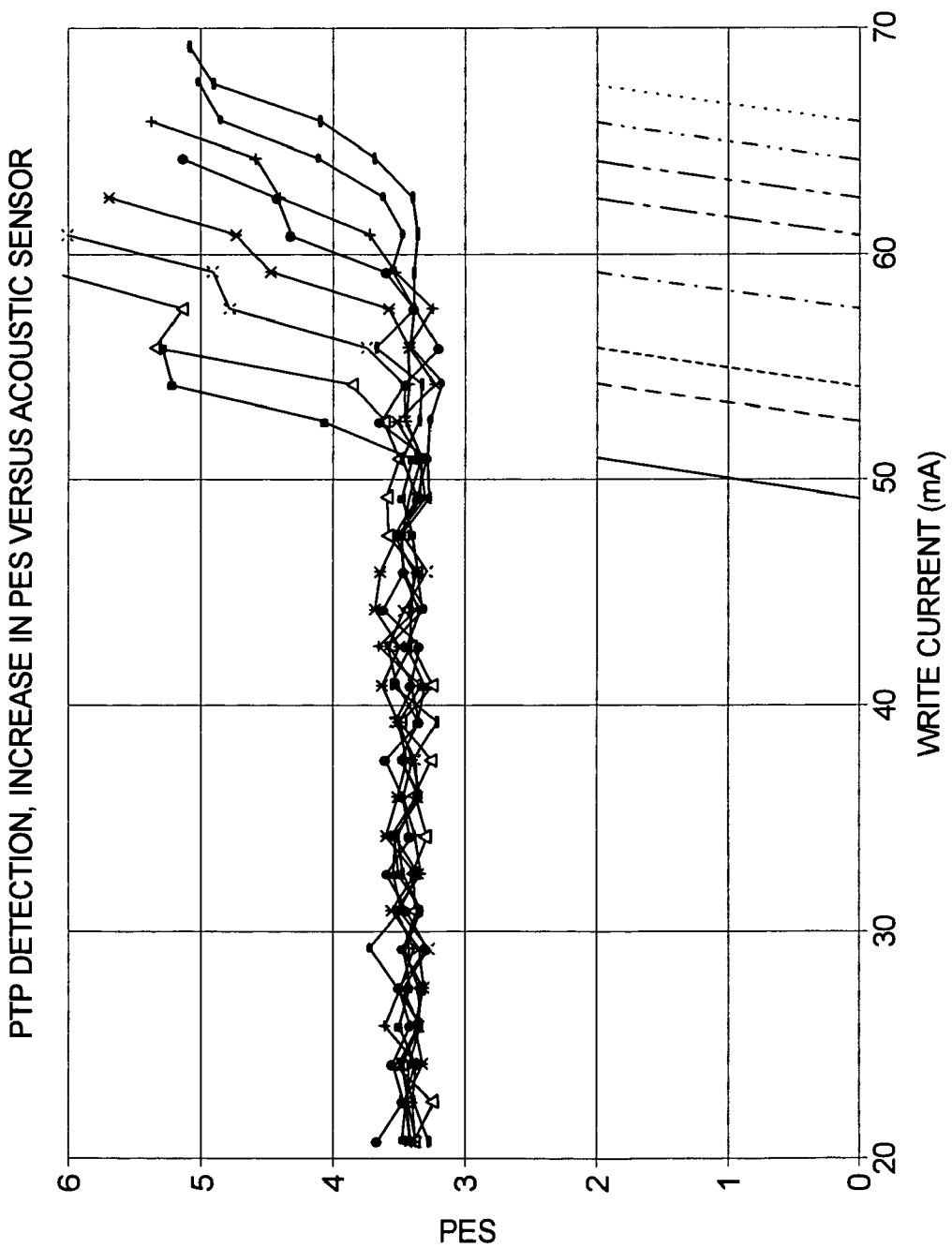
FIG. 12 is a graph showing PES variance as function of write current and also showing an acoustic sensor test.

FIG. 12 is a graph showing PES variance as function of write current and also showing an acoustic sensor test. The present invention detects head-disk contact at one write current that is higher than and two write currents that are lower than those of the acoustic sensor.

Figure 13:
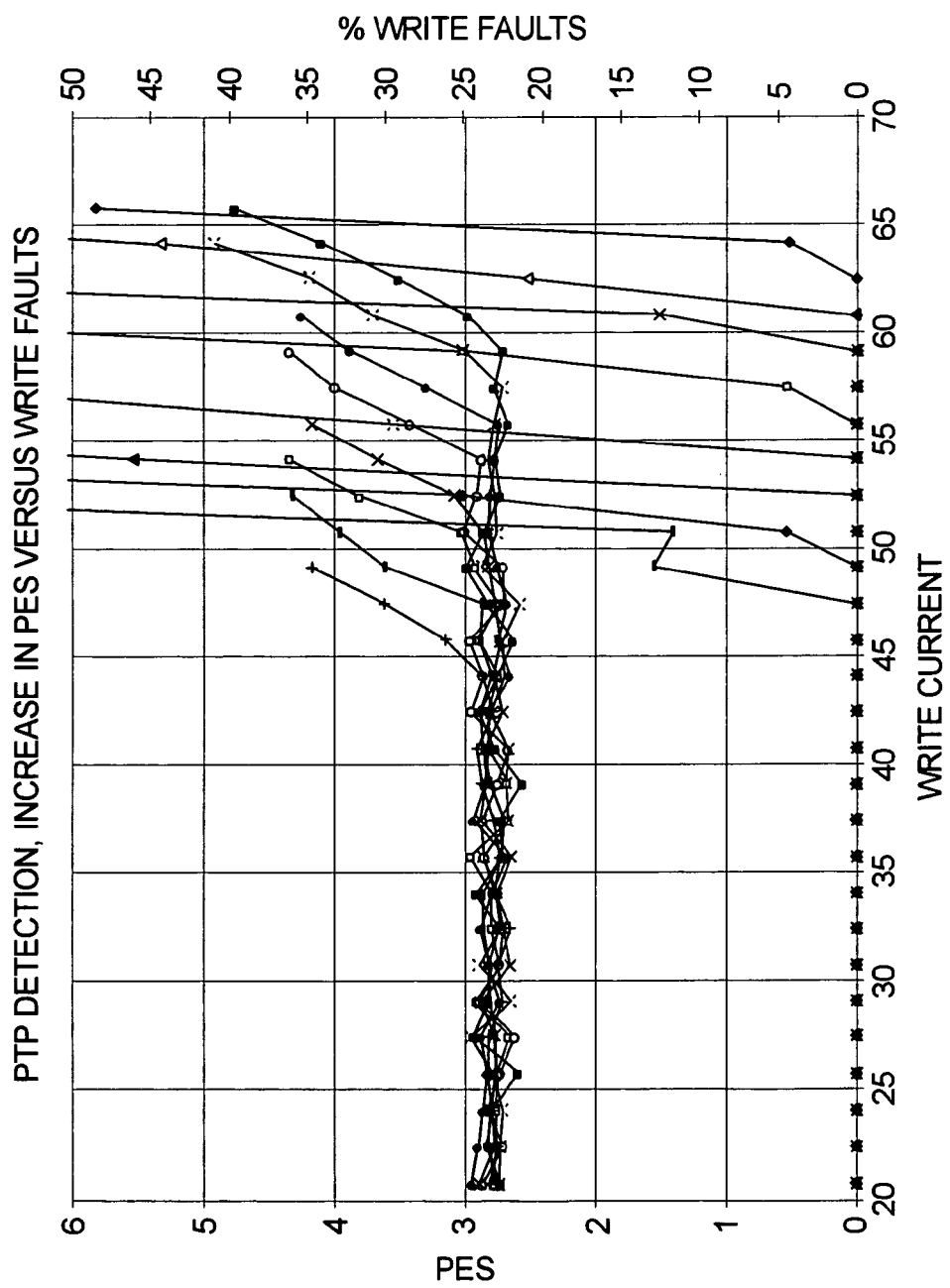
FIG. 13 is a graph showing PES variance as function of write current and also showing write fault detection.

FIG. 13 is a graph showing PES variance as function of write current and also showing write fault detection. The present invention detects head-disk contact at several write currents that are lower than those of the write fault detection.

The present invention includes numerous variations and modifications to the embodiments described above. For instance, head-disk contact can be detected regardless of whether the contact write current is stored. Data storage devices such as magnetic disk drives, optical disk drives and magnetic tape drive can determine the contact write current. A disk drive can determine the contact write current using additional hardware such as memory or without additional hardware. The PES variance groups can be based on servo sector groups with various fixed or varying sizes (such as ⅛ or ¹⁄₁₆ revolution of the disk). The write currents can be selected from a predetermined set of fixed write currents. The disk drive can set a maximum write current at or below the contact write current, can set a minimum write current below the contact write current and can store the contact write current in a servo sector, a non-volatile electronic memory device or even externally to the disk drive.

The foregoing discussion of the invention has been presented for purposes of illustration and description, and is not intended to limit the invention to the forms disclosed herein. Although the description of the invention has included embodiments and certain variations and modifications, other variations and modifications are within the scope of the invention, as may be within the skill and knowledge of those in the art, after understanding the present disclosure.

What is claimed is:

1. In a disk drive that includes a disk and a head that reads from and writes to the disk, wherein the head writes to the disk in response to a write current, and the disk drive generates a position error signal (PES) to position the head relative to the disk in response to the head reading a servo sector on the disk, a method of determining a contact write current that causes the head to contact the disk, the method comprising:

generating PES's in response to the head reading servo sectors on the disk;

calculating PES variances, wherein each PES variance is a statistical measure of a different group of the PES's;

calculating a change in the PES variances; and selecting the contact write current in response to the change in the PES variances;

the method including calculating a first PES variance and then a second PES variance, and selecting the contact write current in response to the second PES variance exceeding the first PES variance by a threshold.

2. The method of claim 1, wherein calculating the PES variances includes calculating a first group of the PES variances based on a first group of the servo sectors that are consecutive servo sectors in a track on the disk, and calculating a second group of the PES variances based on a second group of the servo sectors that are consecutive servo sectors in the track.

3. The method of claim 2, wherein the first and second groups of the servo sectors contain the same number of servo sectors and overlap.

4. The method of claim 3, wherein the first and second groups of the servo sectors are offset by a single servo sector.

5. The method of claim 4, wherein the first and second groups of the servo sectors each cover ⅛ revolution of the disk.

6. The method of claim 2, including calculating first PES variances in the first and second groups of the PES variances based on PES's generated while the head has a first temperature, and calculating second PES variances in the first and second groups of the PES variances based on PES's generated while the head has a second temperature that is greater than the first temperature.

7. The method of claim 6, including calculating the first PES variances based on PES's generated during an operation of the head in which no write current is applied to the head, and calculating the second PES variances based on PES's generated during a write operation of the head in which a write current is applied to the head.

8. The method of claim 6, including calculating the first PES variances based on PES's generated during a first write operation of the head in which a first write current is applied to the head, and calculating the second PES variances based on PES's generated during a second write operation of the head in which a second write current that is greater than the first write current is applied to the head.

9. The method of claim 2, including calculating at least one PES variance in the first group of the PES variances based on PES's generated during a write operation of the head in which a write current is applied to the head, and calculating the second group of the PES variances based on PES's generated during an operation of the head in which no write current is applied to the head.

10. The method of claim 9, including calculating all but one PES variance in the first group of the PES variances based on PES's generated during write operations of the head in which different write currents are applied to the head.

11. The method of claim 9, including calculating one PES variance in the first group of the PES variances based on PES's generated during an operation of the head in which no write current is applied to the head.

12. The method of claim 2, wherein the first and second groups of the PES variances contain the same number of PES variances, the first and second groups of the servo sectors contain the same number of servo sectors and overlap, and multiple servo sectors are in the first and second groups of the servo sectors.

13. The method of claim 12, wherein the first and second groups of the servo sectors are offset by a single servo sector.

14. The method of claim 1, wherein generating the PES's includes the head reading the servo sectors from a track on the disk, and calculating the PES variances includes calculating groups of the PES variances based on overlapping groups of the servo sectors, wherein each group of the PES variances corresponds to a group of the servo sectors, and each PES variance in the group of the PES variances is calculated based on the PES's generated by an operation of the head in which a different write current is applied to the head.

15. The method of claim 14, wherein first PES variances in each group of the PES variances are calculated based on PES's generated by an operation of the head in which no write current is applied to the head.

16. The method of claim 1, wherein calculating each PES variance includes calculating a standard deviation of the corresponding group of the PES's.

17. The method of claim 1, wherein calculating each PES variance includes calculating multiple PES variances during multiple revolutions of the disk and averaging the multiple PES variances.

18. The method of claim 1, including calculating a first PES variance and then a second PES variance, and selecting the contact write current in response to the second PES variance exceeding the first PES variance.

19. The method of claim 1, including calculating a first PES variance and then a second PES variance, and selecting the contact write current as a write current associated with the second PES variance in response to the second PES variance exceeding the first PES variance.

20. The method of claim 1, including calculating a first PES variance and then a second PES variance, and selecting the contact write current as a write current associated with the second PES variance in response to the second PES variance exceeding the first PES variance by a threshold.

21. The method of claim 1, including calculating a first PES variance and then second and third PES variances, and selecting the contact write current in response to the second and third PES variances exceeding the first PES variance.

22. The method of claim 1, including calculating a first PES variance and then second and third PES variances, and selecting the contact write current in response to the second and third PES variances exceeding the first PES variance by a threshold.

23. The method of claim 1, including calculating a first PES variance and then multiple PES variances, and selecting the contact write current as a write current associated with one of the multiple PES variances in response to the multiple PES variances exceeding the first PES variance.

24. The method of claim 1, including calculating a first PES variance and then multiple PES variances, and selecting the contact write current as a write current associated with one of the multiple PES variances in response to the multiple PES variances exceeding the first PES variance by a threshold.

25. The method of claim 1, including calculating a first PES variance associated with no write current and then multiple PES variances associated with different write currents, and selecting the contact write current as the write current associated with one of the multiple PES variances in response to the multiple PES variances exceeding the first PES variance.

26. The method of claim 1, including calculating a first PES variance associated with no write current and then multiple PES variances associated with different write currents, and selecting the contact write current as the write current associated with one of the multiple PES variances in response to the multiple PES variances exceeding the first PES variance by a threshold.

27. The method of claim 1, including calculating a first PES variance and then multiple PES variances associated with different write currents, and selecting the contact write current as the lowest write current associated with the multiple PES variances in response to the multiple PES variances exceeding the first PES variance.

28. The method of claim 1, including calculating a first PES variance and then multiple PES variances associated with different write currents, and selecting the contact write current as the lowest write current associated with the multiple PES variances in response to the multiple PES variances exceeding the first PES variance by a threshold.

29. The method of claim 1, including calculating a first PES variance associated with no write current and then multiple PES variances associated with different write currents, and selecting the contact write current as the lowest write current associated with the multiple PES variances in response to the multiple PES variances exceeding the first PES variance.

30. The method of claim 1, including calculating a first PES variance associated with no write current and then multiple PES variances associated with different write currents, and selecting the contact write current as the lowest write current associated with the multiple PES variances in response to the multiple PES variances exceeding the first PES variance by a threshold.

31. The method of claim 1, including selecting the contact write current for a disk surface of the disk.

32. The method of claim 1, including selecting the contact write current for a group of tracks on the disk.

33. The method of claim 1, including selecting the contact write current for a track on the disk.

34. The method of claim 1, including selecting the contact write current for a group of servo sectors in a track on the disk.

35. The method of claim 1, including selecting the contact write current for a servo sector on the disk.

36. The method of claim 1, including selecting the contact write current for a track on the disk, and storing the contact write current in a servo sector in the track.

37. The method of claim 1, including calculating the change in the PES variances by comparing the PES variances using a threshold.

38. The method of claim 1, including calculating the change in the PES variances using best fit linear regression.

39. The method of claim 1, wherein the contact write current causes the head to contact the disk due to pole tip protrusion of a write pole in the head.

40. In a disk drive that includes a disk and a head that reads from and writes to the disk, wherein the head writes to the disk in response to a write current, and the disk drive generates a position error signal (PES) to position the head relative to the disk in response to the head reading a servo sector on the disk, a method of determining a contact write current that causes the head to contact the disk due to pole tip protrusion of a write pole in the head, the method comprising:

generating PES's in response to the head reading servo sectors on the disk;

calculating PES variances, including calculating a first group of the PES variances based on a first group of the servo sectors that are consecutive servo sectors in a track on the disk, and calculating a second group of the PES variances based on a second group of the servo sectors that are consecutive servo sectors in the track, wherein each PES variance is a statistical measure of a different group of the PES's, the first and second groups of the PES variances contain the same number of PES variances, the first and second groups of the servo sectors contain the same number of servo sectors and overlap and are offset, and multiple servo sectors are in the first and second groups of the servo sectors;

calculating a change in the PES variances; and selecting the contact write current in response to the change in the PES variances.

41. The method of claim 40, wherein the first and second groups of the servo sectors are offset by a single servo sector.

42. The method of claim 40, including calculating first PES variances in the first and second groups of the PES variances based on PES's generated while the head has a first temperature, and calculating second PES variances in the first and second groups of the PES variances based on PES's generated while the head has a second temperature that is greater than the first temperature.

43. The method of claim 40, including calculating all but one PES variance in the first group of the PES variances based on PES's generated during write operations of the head in which different write currents are applied to the head, calculating one PES variance in the first group of the PES variances based on PES's generated during an operation of the head in which no write current is applied to the head, and calculating the second group of the PES variances based on PES's generated during an operation of the head in which no write current is applied to the head.

44. The method of claim 40, wherein calculating each PES variance includes calculating a standard deviation of the corresponding group of the PES's.

45. The method of claim 40, wherein calculating each PES variance includes calculating multiple PES variances during multiple revolutions of the disk and averaging the multiple PES variances.

46. The method of claim 40, including calculating a first PES variance and then a second PES variance, and selecting the contact write current as a write current associated with the second PES variance in response to the second PES variance exceeding the first PES variance by the threshold.

47. The method of claim 40, including calculating a first PES variance associated with no write current and then multiple PES variances associated with different write currents, and selecting the contact write current as the lowest write current associated with the multiple PES variances in response to the multiple PES variances exceeding the first PES variance by a threshold.

48. The method of claim 40, including selecting the contact write current for the track, and storing the contact write current in a servo sector in the track.

49. The method of claim 40, including calculating the change in the PES variances by comparing the PES variances and using a threshold.

50. In a disk drive that includes a disk and a head that reads from and writes to the disk, wherein the head writes to the disk in response to a write current, and the disk drive generates a position error signal (PES) to position the head relative to the disk in response to the head reading a servo sector on the disk, a method of determining a contact write current that causes the head to contact the disk due to pole tip protrusion of a write pole in the head, the method comprising:
- generating PES's in response to the head reading servo sectors on the disk;
- calculating first and second PES variances, wherein each PES variance is a statistical measure of a different group of the PES's; and
- selecting the contact write current in response to a significant increase in the second PES variance over the first PES variance.

51. In a disk drive that includes a disk and a head that reads from and writes to the disk, wherein the head writes to the disk in response to a write current, and the disk drive generates a position error signal (PES) to position the head relative to the disk in response to the head reading a servo sector on the disk, a method of determining a contact write current that causes the head to contact the disk due to pole tip protrusion of a write pole in the head, the method comprising:
- generating PES's in response to the head reading servo sectors on the disk;
- calculating first and second PES variances, including calculating the first PES variance while the head has a first temperature and calculating the second PES variance while the head has a second temperature that is greater than the first temperature, wherein each PES variance is a statistical measure of a different group of the PES's; and
- selecting the contact write current in response to an increase in the second PES variance over the first PES variance.

52. In a disk drive that includes a disk and a head that reads from and writes to the disk, wherein the head writes to the disk in response to a write current, and the disk drive generates a position error signal (PES) to position the head relative to the disk in response to the head reading a servo sector on the disk, a method of determining a contact write current that causes the head to contact the disk due to pole tip protrusion of a write pole in the head, the method comprising:
- generating PES's in response to the head reading servo sectors on the disk;
- calculating first and second PES variances, including calculating the first PES variance based on PES's generated during an operation of the head in which no write current is applied to the head and calculating the second PES variance based on PES's generated during a write operation of the head in which a write current is applied to the head, wherein each PES variance is a statistical measure of a different group of the PES's; and
- selecting the contact write current in response to an increase in the second PES variance over the first PES variance.

53. In a disk drive that includes a disk and a head that reads from and writes to the disk, wherein the head writes to the disk in response to a write current, and the disk drive generates a position error signal (PES) to position the head relative to the disk in response to the head reading a servo sector on the disk, a method of determining a contact write current that causes the head to contact the disk due to pole tip protrusion of a write pole in the head, the method comprising:
- generating PES's in response to the head reading servo sectors on the disk;
- calculating first and multiple PES variances, including calculating the first PES variance based on PES's generated during an operation of the head in which no write current is applied to the head and calculating the multiple PES variances based on PES's generated during write operations of the head in which different write currents are applied to the head, wherein each PES variance is a statistical measure of a different group of the PES's; and
- selecting the contact write current as one of the write currents associated with the multiple PES variances in response to an increase in the multiple PES variances over the first PES variance.

54. In a disk drive that includes a disk and a head that reads from and writes to the disk, wherein the head writes to the disk in response to a write current, and the disk drive generates a position error signal (PES) to position the head relative to the disk in response to the head reading a servo sector on the disk, a method of determining a contact write current that causes the head to contact the disk due to pole tip protrusion of a write pole in the head, the method comprising:
- generating PES's in response to the head reading servo sectors on the disk;
- calculating first and multiple PES variances, including calculating the first PES variance based on PES's generated during an operation of the head in which no write current is applied to the head and calculating the multiple PES variances based on PES's generated during write operations of the head in which different write currents are applied to the head, wherein each PES variance is a statistical measure of a different group of the PES's; and
- selecting the contact write current as the lowest write current associated with the multiple PES variances in response to an increase in the multiple PES variances over the first PES variance.

55. In a disk drive that includes a disk and a head that reads from and writes to the disk, wherein the head writes to the disk in response to a write current, and the disk drive generates a position error signal (PES) to position the head relative to the disk in response to the head reading a servo sector on the disk, a method of determining a contact write current that causes the head to contact the disk due to pole tip protrusion of a write pole in the head, the method comprising:
- generating PES's in response to the head reading servo sectors on the disk;
- calculating first and second average PES variances, wherein calculating each average PES variance includes calculating multiple PES variances during multiple revolutions of the disk and averaging the multiple PES variances, and each PES variance is a statistical measure of a different group of the PES's; and
- selecting the contact write current in response to an increase in the second average PES variance over the first average PES variance.

56. In a disk drive that includes a disk and a head that reads from and writes to the disk, wherein the head writes to the disk in response to a write current, and the disk drive generates a position error signal (PES) to position the head relative to the disk in response to the head reading a servo sector on the disk, a method of determining a contact write current that causes the head to contact the disk due to pole tip protrusion of a write pole in the head, the method comprising:

generating PES's in response to the head reading servo sectors on the disk;

calculating first and second PES variances, wherein each PES variance is a statistical measure of a different group of the PES's; and selecting the contact write current in response to an increase in the second PES variance over the first PES variance determined by comparing the first and second PES variances.

57. In a disk drive that includes a disk and a head that reads from and writes to the disk, wherein the head writes to the disk in response to a write current, and the disk drive generates a position error signal (PES) to position the head relative to the disk in response to the head reading a servo sector on the disk, a method of determining a contact write current that causes the head to contact the disk due to pole tip protrusion of a write pole in the head, the method comprising:

generating PES's in response to the head reading servo sectors on the disk;

calculating first and second PES variances, wherein each PES variance is a statistical measure of a different group of the PES's; and selecting the contact write current in response to an increase in the second PES variance over the first PES variance determined by best fit linear regression.

58. In a disk drive that includes a disk and a head that reads from and writes to the disk, wherein the head writes to the disk in response to a write current, and the disk drive generates a position error signal (PES) to position the head relative to the disk in response to the head reading a servo sector on the disk, a method of detecting contact between the head and the disk due to pole tip protrusion of a write pole in the head, the method comprising:

generating PES's in response to the head reading servo sectors on the disk;

calculating first and second PES variances, wherein each PES variance is a statistical measure of a different group of the PES's; and detecting contact between the head and the disk in response to an increase in the second PES variance over the first PES variance.

59. In a disk drive that includes a disk and a head that reads from and writes to the disk, wherein the head writes to the disk in response to a write current, and the disk drive generates a position error signal (PES) to position the head relative to the disk in response to the head reading a servo sector on the disk, a method of using a contact write current that causes the head to contact the disk due to pole tip protrusion of a write pole in the head, the method comprising:

generating PES's in response to the head reading servo sectors on the disk;

calculating first and second PES variances, wherein each PES variance is a statistical measure of a different group of the PES's;

selecting the contact write current in response to an increase in the second PES variance over the first PES variance; and selecting a maximum write current for the head in response to the contact write current.

* * * * *